US 8,814,969 B2

(12) United States Patent
Nagasaka et al.

(10) Patent No.: US 8,814,969 B2
(45) Date of Patent: Aug. 26, 2014

(54) EXHAUST GAS PURIFICATION DEVICE

(75) Inventors: Shouhei Nagasaka, Oyama (JP); Hiroki Sato, Shimotsuke (JP); Issei Hara, Utsunomiya (JP); Yosuke Obuchi, Yuuki (JP); Tatsushi Itoh, Hirakata (JP); Yuuki Kasaoka, Hirakata (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 0 days.

(21) Appl. No.: 13/637,932

(22) PCT Filed: Feb. 17, 2012

(86) PCT No.: PCT/JP2012/053792
§ 371 (c)(1),
(2), (4) Date: Dec. 10, 2012

(87) PCT Pub. No.: WO2012/127951
PCT Pub. Date: Sep. 27, 2012

(65) Prior Publication Data
US 2013/0097978 A1    Apr. 25, 2013

(30) Foreign Application Priority Data
Mar. 18, 2011   (JP) ................. 2011-060067

(51) Int. Cl.
*B01D 50/00*     (2006.01)
*B01D 59/50*     (2006.01)
*B01D 39/20*     (2006.01)
*B01D 24/00*     (2006.01)
*B01D 39/14*     (2006.01)
*B01D 39/06*     (2006.01)
*F01N 13/18*     (2010.01)
*B01D 46/00*     (2006.01)
*F01N 3/035*     (2006.01)

(52) U.S. Cl.
CPC ........ *B01D 46/0043* (2013.01); *F01N 2470/18* (2013.01); *F01N 13/1877* (2013.01); *F01N 2240/20* (2013.01); *F01N 13/1872* (2013.01); *F01N 13/1844* (2013.01); *F01N 3/035* (2013.01)
USPC ................. 55/332; 55/522; 55/523; 55/524; 422/169; 422/170; 422/171; 422/172; 422/177; 422/178; 422/179; 422/180; 422/181; 422/182

(58) Field of Classification Search
USPC ................. 55/522–524, 332; 422/169–172, 422/177–182
See application file for complete search history.

(56) References Cited

U.S. PATENT DOCUMENTS 3,511,617 A  *  5/1970  Lyben ............................ 422/171
3,522,863 A  *  8/1970  Ignoffo ........................ 181/252

(Continued)

FOREIGN PATENT DOCUMENTS

DE    10 2008 020827 A1    11/2009
JP    H01-127029 A          5/1989

(Continued)

OTHER PUBLICATIONS

International Search Report dated Apr. 17, 2012 from International Application No. PCT/JP2012/053792, 2 pages.

(Continued)

*Primary Examiner* — Amber Orlando
(74) *Attorney, Agent, or Firm* — Fish & Richardson P.C.

(57) ABSTRACT

An exhaust gas emission control system includes a cylindrical inflow body and an inflow pipe into which exhaust gas flows. The exhaust gas emission control system also includes a cylindrical outflow body and an outflow pipe from which the exhaust gas flows. The inflow pipe is provided with a louver member that covers an opening of the inflow body near an upstream side of an exhaust gas flow direction. The louver member is provided with slits and inclined plates capable of changing a flow direction of the exhaust gas passing through the slits into a desired direction.

10 Claims, 7 Drawing Sheets

(56) References Cited

U.S. PATENT DOCUMENTS

| | | | | |
|---|---|---|---|---|
| 4,338,284 | A * | 7/1982 | Ignoffo | 422/171 |
| 4,881,959 | A * | 11/1989 | Kono et al. | 55/282.3 |
| 5,043,146 | A | 8/1991 | Ishikawa et al. | |
| 5,053,062 | A * | 10/1991 | Barris et al. | 55/282 |
| 5,212,948 | A * | 5/1993 | Gillingham et al. | 60/288 |
| 7,713,493 | B2 * | 5/2010 | Bosanec et al. | 422/180 |
| 7,980,068 | B2 * | 7/2011 | Rinaldi | 60/297 |
| 8,359,848 | B2 * | 1/2013 | Bruza et al. | 60/324 |
| 2004/0028587 | A1 * | 2/2004 | Twigg | 423/213.2 |
| 2005/0045036 | A1 * | 3/2005 | Vetter et al. | 96/66 |
| 2005/0126140 | A1 * | 6/2005 | Ito et al. | 55/523 |
| 2009/0260351 | A1 * | 10/2009 | Cremeens et al. | 60/310 |
| 2011/0047963 | A1 | 3/2011 | Kasaoka et al. | |

FOREIGN PATENT DOCUMENTS

| | | |
|---|---|---|
| JP | H05-157218 A | 6/1993 |
| JP | H07-037328 U | 7/1995 |
| JP | H07-279652 A | 10/1995 |
| JP | 2002-277162 A | 9/2002 |
| JP | 2003-074335 A | 3/2003 |
| JP | 2004-263593 A | 9/2004 |
| JP | 2005-042631 A | 2/2005 |
| JP | 2005-147013 A | 6/2005 |
| JP | 2006-015281 A | 1/2006 |
| JP | 2006-063897 A | 3/2006 |
| JP | 2007-016636 A | 1/2007 |
| JP | 2007-209840 A | 8/2007 |
| JP | 2008-106665 A | 5/2008 |
| JP | 2010-007556 A | 1/2010 |
| JP | 2010-159719 A | 7/2010 |
| WO | 2009/139333 A1 | 11/2009 |

OTHER PUBLICATIONS

Notice of Reason(s) for Rejection dated Jul. 31, 2012 from Japanese Application No. 2011-060067, 6 pages.

Office Action issued Sep. 4, 2013 in corresponding Chinese Patent Application No. 201280001028.6, including English translation, 15 pages.

English translation of International Preliminary Report on Patentability issued Sep. 24, 2013 from corresponding International Application No. PCT/JP2012/053792, 6 pages.

Office Action dated Apr. 8, 2014 from corresponding German Patent Application No. 11 2012 000 930.4, including English translation, 9 pages.

* cited by examiner

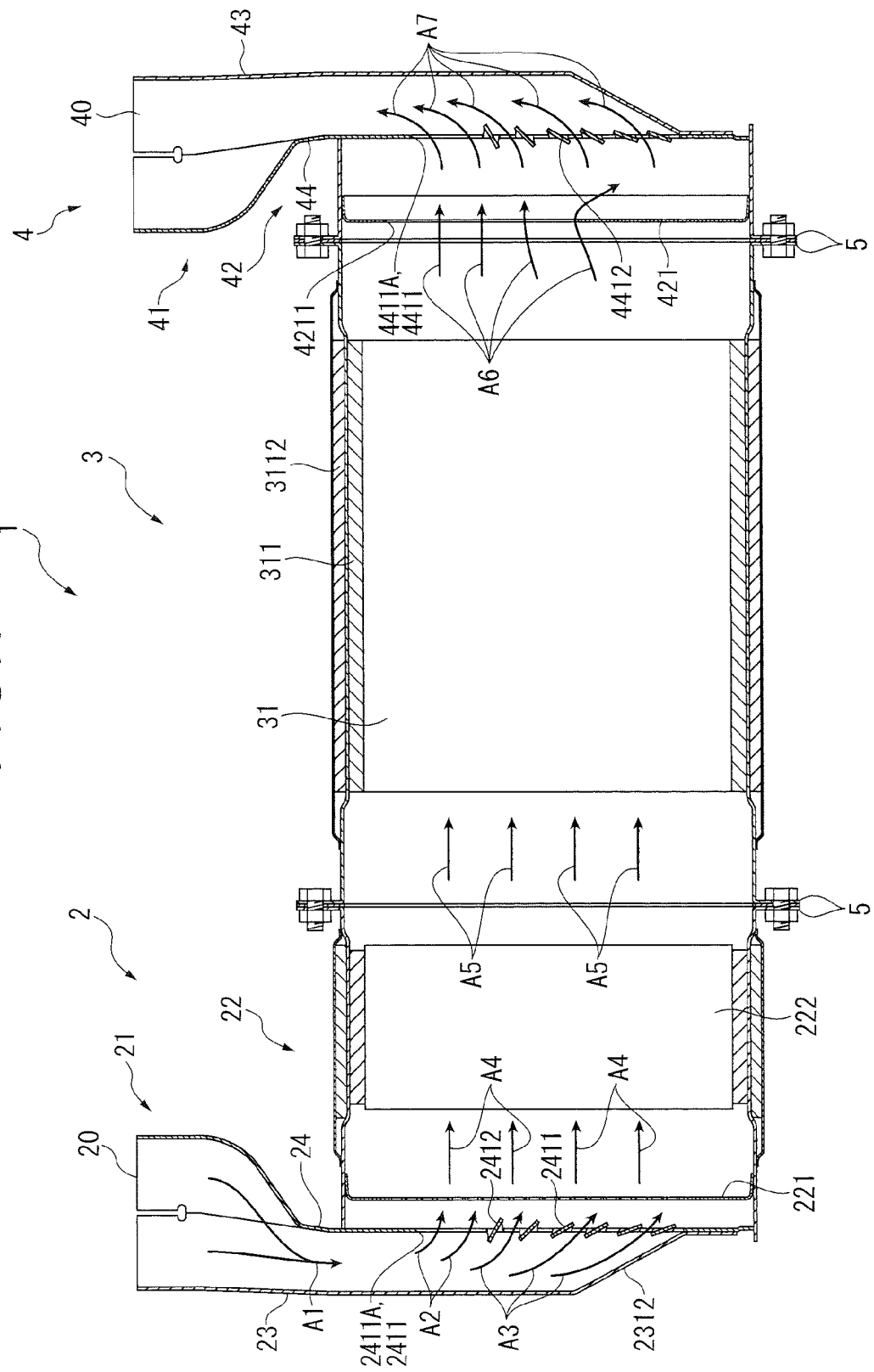

US 8,814,969 B2

EXHAUST GAS PURIFICATION DEVICE

CROSS REFERENCE TO RELATED APPLICATIONS

This application claims priority to Application No. PCT/JP2012/053792 filed on Feb. 17, 2012, which application claims priority to Japanese Application No. 2011-060067, filed on Mar. 18, 2011. The entire contents of the above applications are incorporated herein by reference in their entireties.

TECHNICAL FIELD

The present invention relates to an exhaust gas emission control system.

BACKGROUND ART

It has typically been known that an exhaust gas emission control system is provided in an exhaust pipe of an engine and the like to collect particulate matters (PM) (i.e., particulate substances) contained in exhaust gas which cause black exhaust, thereby preventing discharge of the PM into the atmosphere (see, for instance, Patent Literature 1).

The exhaust gas emission control system of Patent Literature 1 includes an inlet unit, a processing unit that houses a filter for capturing PM in exhaust gas, and an outlet unit, each of the units being formed in a cylindrical shape. The inlet unit and the outlet unit are respectively connected to ends of the processing unit.

The inlet unit includes: an inlet pipe that is connected to an exhaust pipe from an engine; and a first main body pipe that is connected to the end of the processing unit and houses a flow regulation member formed in a meshed pattern. The inlet pipe is connected to a cut portion provided on an outer surface of the first main body pipe in a manner to radially project. With this arrangement, after exhaust gas flowing into the first main body pipe from the inlet pipe of the inlet unit is regulated by the flow regulation member of the first main body pipe, the exhaust gas is purified by the filter inside the processing unit and flows out of the outlet unit.

CITATION LIST

Patent Literature(s)

Patent Literature 1: WO2009/139333

SUMMARY OF THE INVENTION

Problems to be Solved by the Invention

However, in the exhaust gas emission control system of Patent Literature 1, since exhaust gas partially flows into the first main body pipe in a radial direction of the first main body pipe, a flow of the exhaust gas is likely to be ununiformly distributed toward the bottom of the inlet unit. Even though such a flow of the exhaust gas is regulated by the flow regulation member, there is a limit of uniformity of the flow distribution of the exhaust gas, so that the flow distribution may not be sufficiently made uniform. Accordingly, only a specific part of the filter is unavoidably used, so that the filter cannot be efficiently used.

Here, it is considered that the flow distribution of the exhaust gas regulated by the flow regulation member is made uniform by securing a long distance between the flow regulation member and the filter before the exhaust gas flows into the filter.

However, for securing the long distance between the flow regulation member and the filter, the inlet unit and the like become large and, eventually, the exhaust gas emission control system becomes large.

Moreover, in a typical gas emission control system, since a diameter of an outlet pipe provided in the outlet unit is small, exhaust gas after flowing out of a soot filter does not favorably flow out of the outlet pipe, so that the exhaust gas cannot be efficiently discharged.

An object of the invention is to provide an exhaust gas emission control system capable of providing a uniform flow distribution of exhaust gas and reducible in size.

Moreover, an object of the invention is to provide an exhaust gas emission control system capable of improving an exhaust efficiency.

Means for Solving the Problems

An exhaust gas emission control system according to an aspect of the invention includes: a cylindrical inflow body through which exhaust gas passes; an inflow pipe into which the exhaust gas flows, the inflow pipe being provided to the inflow body near an upstream side of an exhaust gas flow direction; a cylindrical outflow body through which the exhaust gas passes; an outflow pipe from which the exhaust gas flows, the outflow pipe being provided to the outflow body near a downstream side of the exhaust gas flow direction; and a filter case that houses a soot filter, the filter case being interposed between the inflow body and the outflow body, in which a louver member is provided that covers at least one of an opening of the inflow body near the upstream side in the exhaust gas flow direction and an opening of the outflow body near the downstream side in the exhaust gas flow direction, and the louver member comprises a plurality of slits and direction changing plates that change a flow direction of the exhaust gas passing through the slits, the direction changing plates being provided to the respective slits.

In the exhaust gas emission control system according to the above aspect of the invention, the louver member is at least provided in the inflow, and a flow regulation member having multiple openings through which the exhaust gas passes is provided near the downstream side relative to the louver member.

In the exhaust gas emission control system according to the above aspect of the invention, the louver member is at least provided in the inflow, and the inflow has a shape that allows the exhaust gas to pass through the inflow in a radial direction of the inflow body until reaching an end of the inflow body near the upstream side, and to flow into the inflow body from the end of the inflow body.

In the exhaust gas emission control system according to the above aspect of the invention, the plurality of slits of the louver member extend in a direction orthogonal to the flow direction of the exhaust gas in the radial direction of the inflow body, and one of the slits provided near the upstream side of the flow direction of the exhaust gas in the radial direction has a large opening area, and the rest of the slits provided closer to the downstream side of the flow direction of the exhaust gas have a smaller opening area.

In the exhaust gas emission control system according to the above aspect of the invention, the plurality of slits of the louver member extend in a direction orthogonal to the flow direction of the exhaust gas in the radial direction of the inflow body, and one of the direction changing plates provided near the upstream side of the flow direction of the exhaust gas in the radial direction has a large inclination angle, and the rest of the direction changing plates provided closer to the downstream side of the flow direction of the exhaust gas have a smaller inclination angle.

Note that the inclination angle herein refers to an inclination angle relative to an in-plane direction of the plate-shaped louver member.

In the exhaust gas emission control system according to the above aspect of the invention, the louver member is at least provided in the outflow pipe, and a blocking plate that prevents inflow-water through the outflow pipe from entering the filter case is provided near the upstream side relative to the louver member.

In the exhaust gas emission control system according to the above aspect of the invention, the louver member is provided in each of the inflow pipe and the outflow pipe.

An exhaust gas emission control system according to another aspect of the invention includes: a cylindrical inflow body through which exhaust gas passes; an inflow pipe into which the exhaust gas flows, the inflow pipe being provided to the inflow body near an upstream side of an exhaust gas flow direction; a cylindrical outflow body through which the exhaust gas passes; an outflow pipe from which the exhaust gas flows, the outflow pipe being provided to the outflow body near a downstream side of the exhaust gas flow direction; and a filter case that houses a soot filter, the filter case being interposed between the inflow body and the outflow body, in which the inflow pipe has a shape that allows the exhaust gas to pass through the inflow pipe in a radial direction of the inflow body until reaching an end of the inflow body near the upstream side, and to flow into the inflow body from the end of the inflow body, the outflow pipe has a shape that allows the exhaust gas after flowing out of an end of the outflow body near the downstream side to flow out in the radial direction of the outflow body, the inflow pipe includes a first louver member that covers an opening of the inlet body near the upstream side, the outflow pipe includes a second louver member that covers an opening of the outflow body near the downstream side, the inlet body houses an oxidation catalyst for oxidizing a dosing fuel to generate heat and includes a flow regulation member that has multiple openings through which the exhaust gas passes and is provided near the downstream side relative to the first louver member, the outflow body includes a blocking plate that prevents inflow-water through the outflow pipe from entering the filter case and is provided near the upstream side relative to the second louver member, the first louver member includes: a plurality of slits that extend in a direction orthogonal to the flow direction of the exhaust gas in the radial direction of the inflow body; and direction changing plates that change a flow direction of the exhaust gas passing through the slits, the direction changing plates being provided to the respective slits, and the second louver member includes: a plurality of slits that extend in a direction orthogonal to the flow direction of the exhaust gas in the radial direction of the outflow body; and direction changing plates that change a flow direction of the exhaust gas passing through the slits, the direction changing plate being provided to the respective slits.

In the exhaust gas emission control system according to the above aspect of the invention, the louver member covers at least one of the opening of the inflow body near the upstream side in the exhaust gas flow direction and the opening of the outflow body near the downstream side in the exhaust gas flow direction. The louver member includes the slits and the inclined plates and changes the flow direction of the exhaust gas passing through the slits into a desired direction.

For instance, even when the flow distribution of the exhaust gas flowing from the inflow pipe is not uniform, the louver member changes the flow of the exhaust gas by covering the opening of the inflow body, whereby the flow distribution of the exhaust gas can be forcibly made uniform. In other words, the flow distribution of the exhaust gas in the inflow body is made uniform and the exhaust gas flows into the soot filter located near the downstream side relative to the inflow body while keeping the flow distribution of the exhaust gas uniform, so that the exhaust gas flows into the soot filter without concentrating in a specific part and a lifetime of the soot filter can be prolonged.

Conventionally, the flow distribution of exhaust gas regulated by the flow regulation member is made uniform by securing a long distance between the flow regulation member and the soot filter. However, in the invention, the flow distribution of the exhaust gas is made uniform by correcting the exhaust gas flow direction with the louver member, so that the distance between the flow regulation member and the soot filter can be shortened than ever before and a size of the exhaust gas emission control system can be reduced.

On the other hand, when the opening of the outflow body is covered with the louver member, the flow direction of the exhaust gas passing through the soot filter is changed by the louver member into a direction in which the exhaust gas flows out through the outflow pipe.

With this arrangement, the exhaust gas easily flows out through the outflow pipe toward the outside and an increase in back pressure in the outflow body and the outflow pipe is suppressed. Consequently, the exhaust gas can smoothly flow both on a side of the inflow body and inflow pipe and on a side of the outflow body and the outflow pipe, thereby improving the exhaust efficiency in the entire device.

In the invention, when the flow regulation member is provided near the downstream side relative to the louver member, the flow distribution of the exhaust gas is made further uniform, so that it is expectable that the lifetime of the soot filter can be further prolonged.

In the invention, the inflow pipe has a shape that allows the exhaust gas to pass through the inflow pipe in the radial direction of the inflow body until reaching the end of the inflow body, and to flow into the inflow body in an axis direction of the inflow body from the end of the inflow body. Accordingly, since the inflow pipe can be extended in the radial direction of the inflow body, an occupied space can be more reduced than when the inflow pipe is extended in the axial direction, so that space-saving of the engine room is achievable.

Here, by changing the opening areas of the slits and the inclination angles of the direction changing plates in the louver member relative to the flow direction of the exhaust gas, a flow amount of the exhaust gas passing through the louver member is suitably adjustable and uniformity of the flow distribution is promotable.

In the invention, when the louver member is provided in the louver member and the blocking plate is provided near the upstream side relative to the louver member, the blocking plate causes the flow of the exhaust gas to shift. However, the louver member provided near the downstream side relative to the blocking plate allows even such a shifted flow of the exhaust gas to be smoothly discharged, so that the exhaust efficiency is favorably maintainable. Moreover, the blocking plate prevents rainwater and the like from entering the filter case to improve weather resistance of the soot filter.

When the louver member is provided in both the inflow pipe and the outflow pipe, both the above-mentioned objects of the invention are achievable.

BRIEF DESCRIPTION OF DRAWINGS

FIG. 7 is a cross-sectional view of the exhaust gas emission control system.

DESCRIPTION OF EMBODIMENT(S)

An exemplary embodiment of the invention will be described below with reference to the attached drawings.

Figure 1:
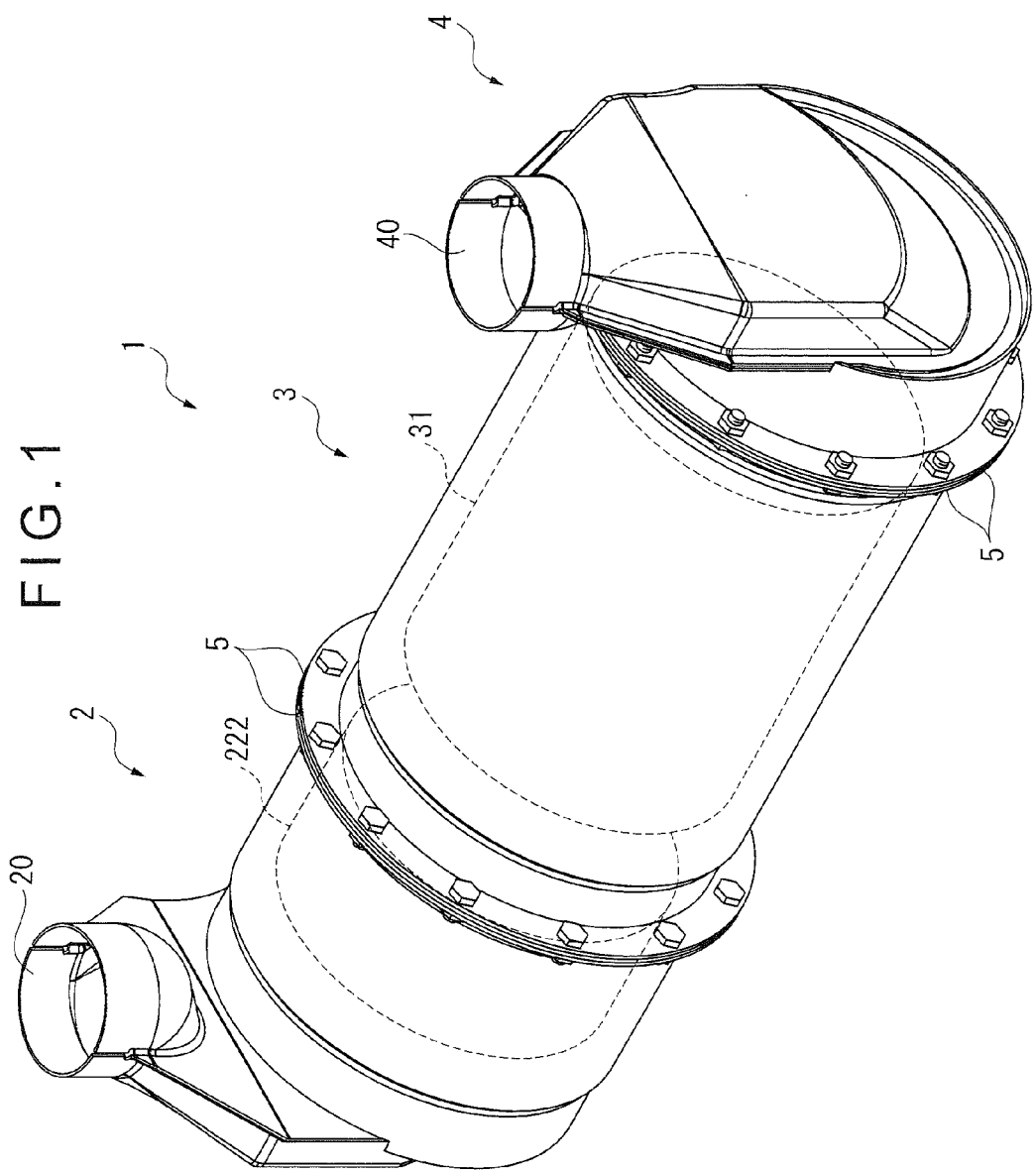
FIG. 1 is an overall perspective view showing appearance of an exhaust gas emission control system according to an exemplary embodiment of the invention.

FIG. 1 is an overall perspective view showing appearance of an exhaust gas emission control system 1 according to the exemplary embodiment.

Hereinafter, an upstream side in an exhaust gas flow direction is referred to as an "upstream side" and a downstream side in the exhaust gas flow direction is referred to as a "downstream side."

The exhaust gas emission control system 1 is provided in an exhaust pipe of a diesel engine (not shown) (hereinafter, simply referred to as an "engine") for capturing PM contained in exhaust gas. The exhaust gas emission control system 1 includes: an inlet case 2 in a bottomed cylindrical shape which is connected to the exhaust pipe and into which exhaust gas flows; a filter case 3 in a cylindrical shape that is disposed to the inlet case 2 near the downstream side; and an outlet case 4 in a bottomed cylindrical shape which is connected to the filter case 3 near the downstream side and from which exhaust gas is discharged. The cases 2 to 4 are mutually bolted through flange joints 5 provided at the respective edges of openings of the cases 2 to 4.

Figure 2:
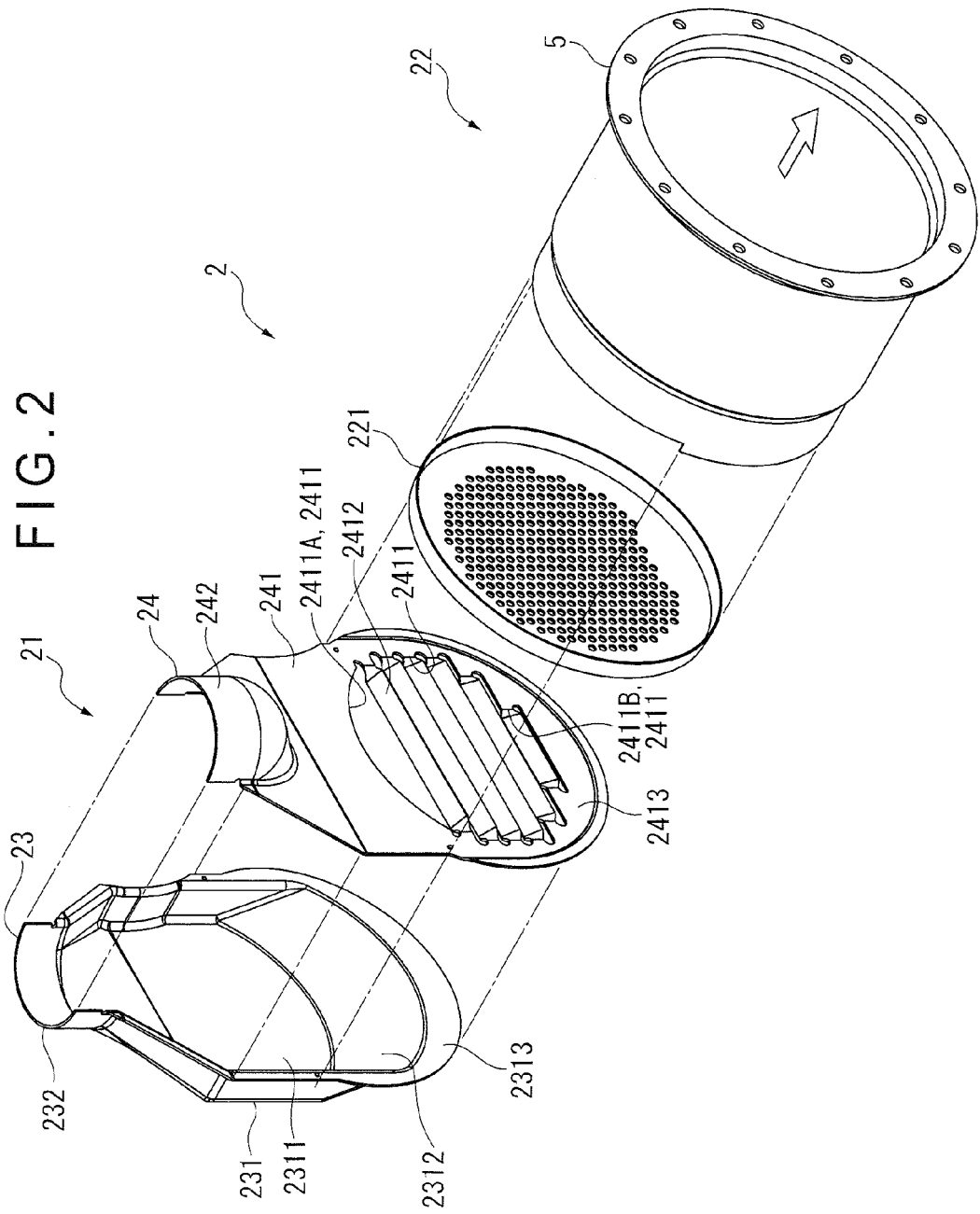
FIG. 2 is an exploded perspective view showing an inlet case of the exhaust gas emission control system.
Figure 3:
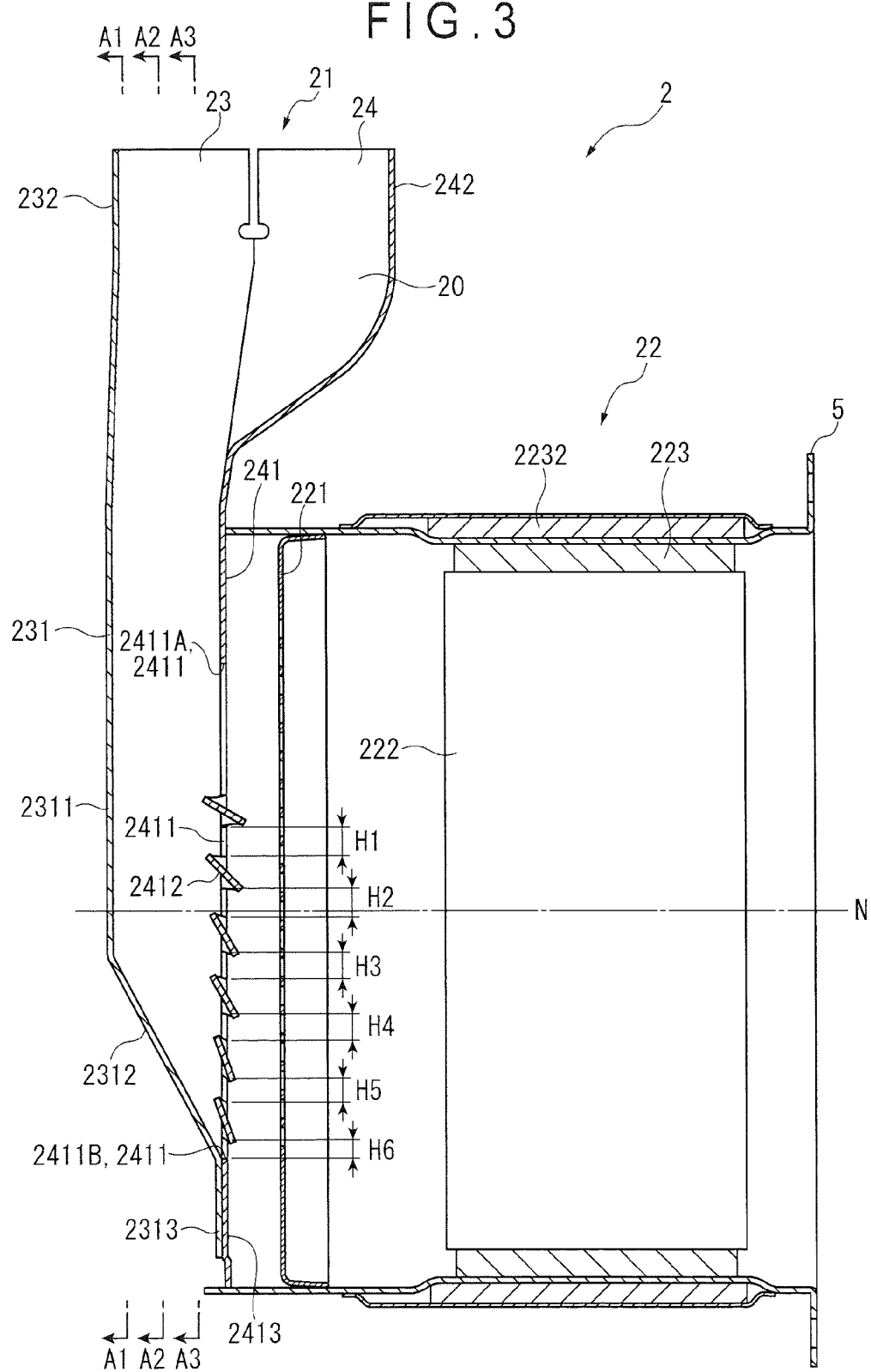
FIG. 3 is a cross-sectional view of the inlet case.

FIG. 2 is an exploded perspective view of the inlet case 2. FIG. 3 is a cross-sectional view of the inlet case 2.

The inlet case 2 has an opening near the downstream side. On the edge of the inlet case 2 near the opening, the flange joint 5 is integrally formed. The inlet case 2 includes: a cylindrical inflow body 22; and an inflow pipe 21 that bulges out in a direction of an axis N of the cylindrical inflow body 22 and projects in a radial direction thereof to be connected to the exhaust pipe, in which the inflow pipe 21 closes an opening of the inflow body 22 near the upstream side.

The inflow pipe 21 is provided by jointing an upstream closing member 23 near the upstream side and a first louver member 24 near the downstream side.

The upstream closing member 23 includes an end surface 2313 that forms an end of the inflow body 22 near the upstream side and a lateral wall 231 that bulges out from the end surface 2313 and is used for defining an exhaust gas flow path. The upstream closing member 23 further includes a semi-cylindrical first inlet 232 that projects in the radial direction of the inflow body 22 and is formed continuously from the lateral wall 231 near the upstream side.

The lateral wall 231 is formed with a vertical surface 2311 and an inclined surface 2312 that is inclined in a manner to enlarge from a lower end of the vertical surface 2311 toward the downstream side. In other words, as shown in FIG. 3, seen along an A1-A1 cross section, an A2-A2 cross section and an A3-A3 cross section which are perpendicular to the axis N, a cross-sectional area of an inner space defined by the upstream closing member 23 increases from an arrow A1 toward an arrow A3 because of an inclination direction of the inclined surface 2312.

The first louver member 24 corrects the flow direction of inflowing exhaust gas and allows the exhaust gas to uniformly flow into an end surface of a later-described soot filter 31 near the upstream side. The first louver member 24 includes a plate-shaped louver portion 241 through which the exhaust gas passes. The first louver member 24 further includes a semi-cylindrical second inlet 242 that projects in the radial direction of the inflow body 22 and is formed continuously from the louver portion 241 near the upstream side.

The louver portion 241 includes: a plurality of slits 2411 that extend in a horizontal direction (i.e., a direction orthogonal to the flow direction of the exhaust gas passing through the first and second inlets 232 and 242: a length direction); inclined plates (direction changing plates) 2412 that are provided in the respective slits 2411 to change the flow direction of the exhaust gas passing through the slits 2411; and an abutment surface 2413 on which the end surface 2313 of the upstream closing member 23 is abutted.

Among the plurality of slits 2411, a slit 2411A near the second inlet 242 has the maximum slit opening area. In the rest of the slits 2411, opening heights thereof are represented by H1 to H6, in which the slits 2411 closer to the bottom of the drawing have a less opening height (H1>H2>H3>H4>H5>H6) and the slit 2411B has the minimum opening height. As seen from FIG. 2, in the slits 2411, an opening length becomes longer as the slit 2411 is closer to the center of the louver portion 241 and the opening length becomes shorter as the slit 2411 is farther away from the center. Consequently, an opening area becomes larger as the slit 2411 is closer to the upstream side.

The inclined plate 2412 provides a predetermined uniformity of the flow contribution of the exhaust gas that flows into the inflow body 22 from the end thereof, in conjunction with a later-described flow regulation member 221 near the downstream side. In the exemplary embodiment, the exhaust gas flows in the radial direction of the inflow body 22 until reaching the end thereof. Accordingly, among the inclined plates 2412 of the first louver member 24 provided close to the end of the inflow body 22, the inclined plate 2412 close to the slit 2411A near the upstream side has the maximum inclination angle, and the inclination angle of the inclined plate 2412 becomes smaller as the inclined plate 2412 approaches the slit 2411B near the downstream side.

Note that the inclination angle herein refers to an inclination angle relative to an in-plane direction of the plate-shaped louver portion 241. The inclination direction of the inclined plates 2412 is the same as that of the inclined surface 2312 of the upstream closing member 23.

In other words, although most of the exhaust gas passing through the inflow pipe 21 in the radial direction of the inflow body 22 typically tends to pass through the vicinity of the inclined surface 2312, a flow amount of the exhaust gas passing through the slits 2411 near the upstream side increases when the openings of the slits 2411 are made larger toward the upstream side of the flow direction of the exhaust gas, and the inclination angles of the inclined plates 2412 are made larger toward the upstream side. With this arrangement, the flow amount of the exhaust gas passing through the vicinity of the inclined surface 2312 can be decreased to provide a uniform flow distribution of the exhaust gas flowing from the inflow pipe 21 into the inflow body 22.

The second inlet 242 has a semi-circular shape near an exhaust gas inlet. When the second inlet 242 is seen from the lateral side, the shape of the second inlet 242 is constricted toward the downstream side, so that the second inlet 242 is eventually formed to be continuous to the plate-shaped louver portion 241. A cylindrical inlet 20 to be connected to the exhaust pipe is provided by jointing the second inlet 242 to the first inlet 232. Further, the inflow pipe 21 is provided by jointing the first louver member 24 to an edge of the inflow body 22 near the upstream side and further jointing an open end of the lateral wall 231 of the upstream closing member 23 to the first louver member 24. With this arrangement, an overall shape of the inflow pipe 21 includes a cylindrical shape near the exhaust gas inlet and a flat boxed shape near the end of the inflow body 22 near the upstream side.

Inside the inflow body 22, the flow regulation member 221 that regulates a flow of the exhaust gas is provided near the upstream side, and an oxidation catalyst 222 that oxidizes a dosing fuel (e.g., light oil) supplied by a fuel supplier (not shown) to generate heat is provided near the, downstream side. Between an inner surface of the inflow body 22 and an outer circumference of the oxidation catalyst 222 is provided a heat insulator/retention member 223 made of ceramic fibers which suppresses an increase in a surface temperature of the inflow body 22 and retains the oxidation catalyst 222 in the body 22. Further, on the outer circumference of the inflow body 22 is provided a heat insulator 2232.

The flow regulation member 221 is provided in a form of a disc having a number of openings in a net or meshed pattern through which the exhaust gas passes.

The oxidation catalyst 222 oxidizes the dosing fuel to generate heat, thereby increasing the temperature of the exhaust gas. The heated exhaust gas allows PM accumulated in the later-described soot filter 31 near the downstream side to combust for removal, thereby recovering the soot filter 31.

The filter case 3 has openings near the upstream and downstream sides. On the edges of the filter case near the openings, the flange joints 5 are integrally formed. The soot filter 31 (a part shown by a broken line in FIG. 1) for capturing PM in exhaust gas is housed in the filter case 3. Between an outer circumference of the soot filter 31 and an inner surface of the filter case 3 is provided a heat insulator/retention member 311 made of ceramic fibers (see FIG. 7). Further, on an outer circumference surface of the filter case 3 is provided a heat insulator 3112 (see FIG. 7).

Figure 4:
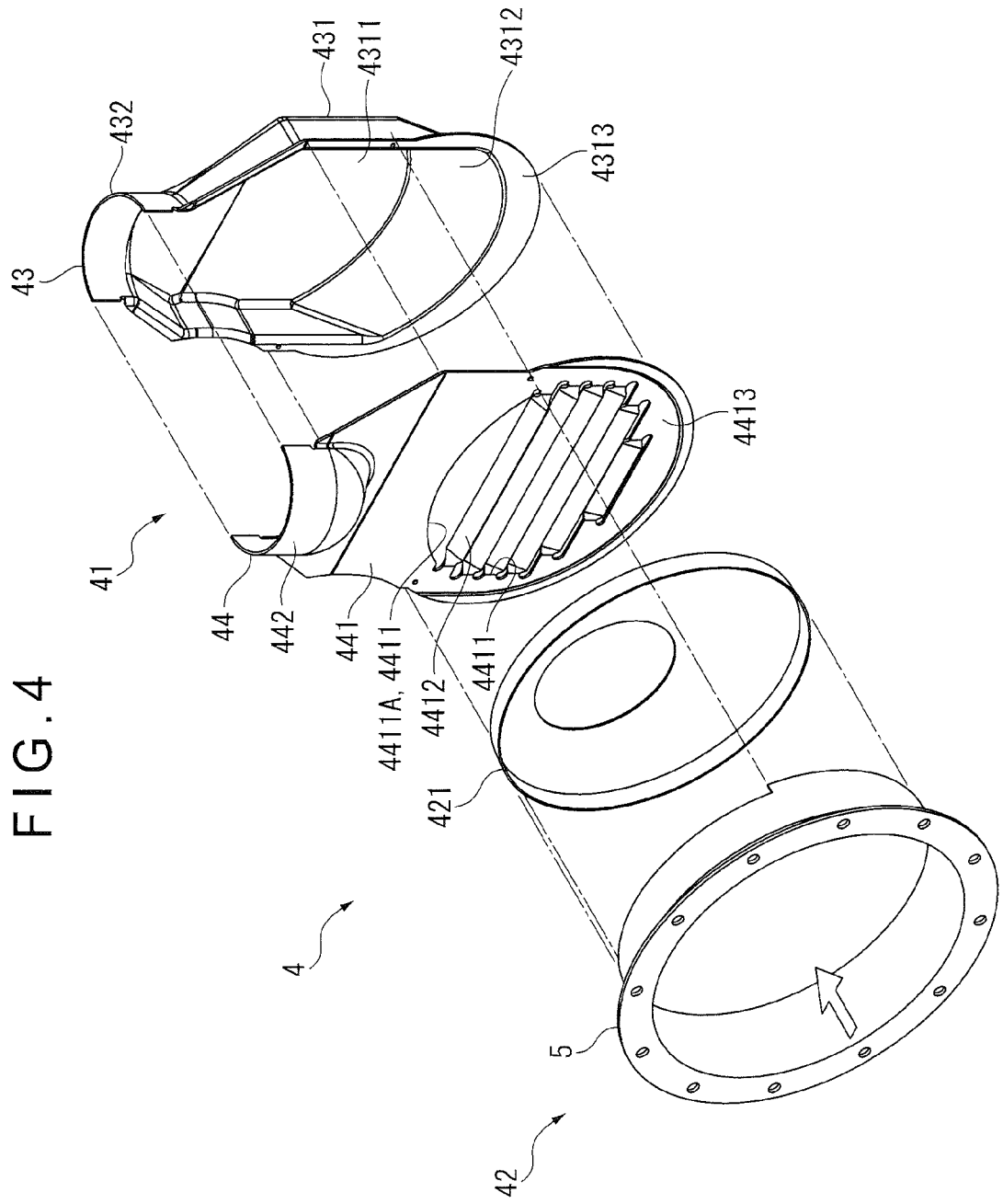
FIG. 4 is an exploded perspective view showing an outlet case of the exhaust gas emission control system.
Figure 5:
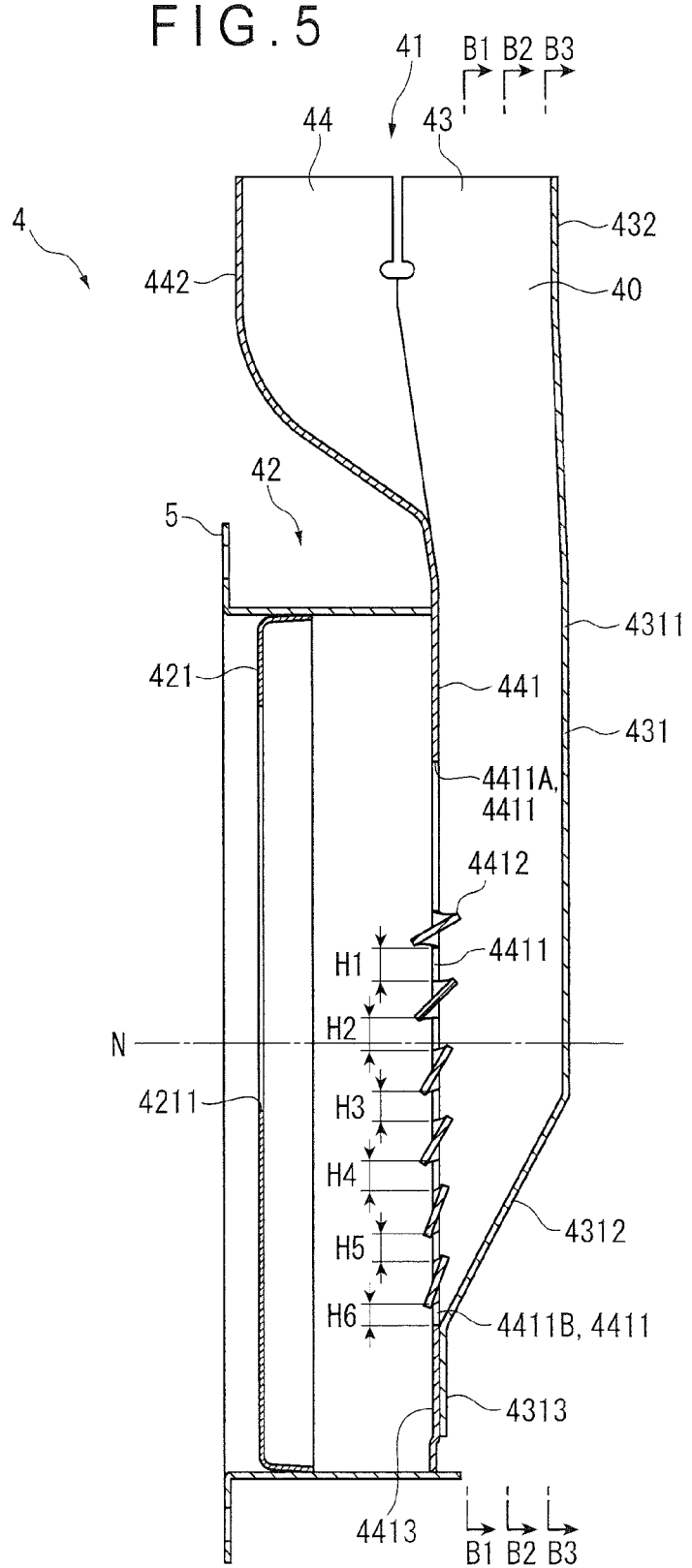
FIG. 5 is a cross-sectional view of the outlet case.
Figure 6:
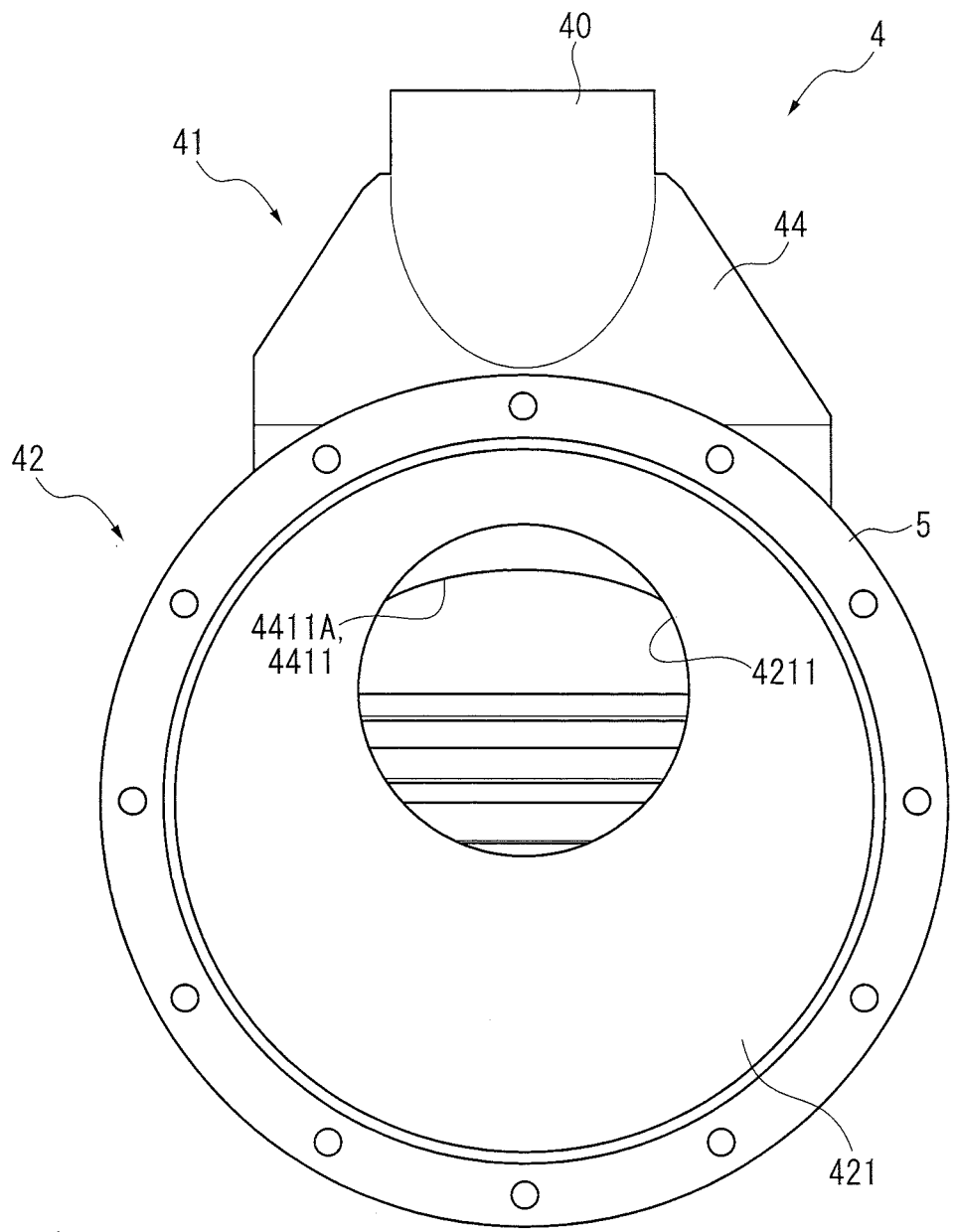
FIG. 6 is a plan view of the outlet case seen from an upstream side in an exhaust gas flow direction.

FIG. 4 is an exploded perspective view of the outlet case 4. FIG. 5 is a cross-sectional view of the outlet case 4. FIG. 6 is a plan view of the outlet case 4 seen from the upstream side.

The outlet case 4 has an opening near the downstream side. On the edge of the outlet case 4 near the opening, the flange joint 5 is integrally formed. The outlet case 4 includes: a cylindrical outflow body 42; and an outflow pipe 41 that bulges out in a direction of an axis N of the cylindrical outflow body 42 and projects in a radial direction thereof to be connected to a tail pipe for discharge, in which the outflow pipe 41 closes an opening of the outflow body 42 near the upstream side.

The outflow pipe 41 is provided by jointing a downstream closing member 43 near the downstream side and a second louver member 44 near the upstream side. Note that the downstream closing member 43 and the second louver member 44 in the outflow pipe 41 have the same structure as the upstream closing member 23 and the first louver member 24 in the inflow pipe 21. The downstream closing member 43 and the second louver member 44 will be specifically described below.

The downstream closing member 43 includes an end surface 4313 that forms an end of the outflow body 42 near the downstream side and a lateral wall 431 that bulges out from the end surface 4313 for forming an exhaust gas flow path. The downstream closing member 43 further includes a semi-cylindrical first outlet 432 that projects in the radial direction of the outflow body 42 and is formed continuously from the lateral wall 431 near the downstream side.

The lateral wall 431 is formed with a vertical surface 4311 and an inclined surface 4312 that is inclined in a manner to enlarge from a lower end of the vertical surface 4311 toward the upstream side. In this case, as shown in FIG. 5, seen along a B1-B1 cross section, a B2-B2 cross section and a B3-B3 cross section which are perpendicular to the axis N, a cross-sectional area of an inner space defined by the downstream closing member 43 decreases from an arrow B1 toward an arrow B3 because of an inclination direction of the inclined surface 4312.

The second louver member 44 guides the exhaust gas purified by the soot filter 31 to a later-described outlet 40 and has the same structure as the first louver member 24 provided in the inlet case 2. Accordingly, the second louver member 44 also includes a plate-shaped louver portion 441 through which the exhaust gas passes. The second louver member 44 further includes a semi-cylindrical second outlet 442 that projects in the radial direction of the outflow body 42 and is formed continuously from the louver portion 441 near the downstream side.

The louver portion 441 includes: a plurality of slits 4411 that extend in a horizontal direction (i.e., a direction orthogonal to the flow direction of the exhaust gas passing through the first and second outlets 432 and 442); inclined plates (direction changing plates) 4412 that are provided in the respective slits 4411 and change the flow direction of the exhaust gas passing through the slits 4411; and an abutment surface 4413 on which the end surface 4313 of the downstream closing member 43 is abutted.

The slits 4411 and the inclined plates 4412 are configured in the same manner as the slits 2411 and the inclined plates 2412 of the first louver member 24. Specifically, among the plurality of slits 4411, a slit 4411A near the second outlet 442 has the maximum slit opening area. In the rest of the slits 4411, opening heights thereof are represented by H1 to H6, in which the slits 4411 closer to the bottom of the drawing have a less opening height (H1>H2>H3>H4>H5>H6) and the slit 4411B has the minimum opening height. As seen from FIG. 4, in the slits 4411, an opening length becomes longer as the slit 4411 is closer to the center of the louver portion 441 and the opening length becomes shorter as the slit 4411 is farther away from the center. Consequently, an opening area becomes larger as the slit 4411 is closer to a later-described air vent 4211.

In other words, the slits 4411 and the inclined plates 4412 more reliably change the flow of the exhaust gas that tends to flow out to be ununiformly distributed between the end of the outflow body 42 and the axis N into a flow of the exhaust gas along the radial direction. By changing the flow of the exhaust gas with the second louver member 44, the exhaust gas is smoothly discharged and increase in a back pressure is suppressed to improve an exhaust efficiency. In this exemplary embodiment, although a later-described blocking plate 421 is provided inside the outflow body 42 to cause the exhaust gas to flow out of the blocking plate 421 in an ununiform manner, the slits 4411 and the inclined plates 4412 allow such an ununiform flow of the exhaust gas to be efficiently discharged.

The second outlet 442 has a semi-circular shape near an exhaust gas outlet. When the second outlet 442 is seen from the lateral side, the shape of the second outlet 442 is constricted toward the upstream side, so that the second outlet 442 is eventually formed to be continuous to the plate-shaped louver portion 441. The cylindrical outlet 40 to be connected to the exhaust pipe is provided by jointing the second outlet 442 to the first outlet 432. The outflow pipe 41 is provided by jointing the second louver member 44 to an edge of the outflow body 42 near the downstream side, jointing an open end of the lateral wall 431 of the downstream closing member 43 to the second louver member 44, and further jointing the outer periphery of the end surface 4313 of the downstream closing member 43 to the outer periphery of the outflow body 42. With this arrangement, an overall shape of the outflow pipe 41 includes a cylindrical shape near the exhaust gas outlet and a flat boxed shape near the end of the outflow body 42 near the downstream side.

The blocking plate 421 is provided inside the outflow body 42 near the upstream side.

The blocking plate 421 prevents rainwater and the like from entering the filter case 3 while allowing the exhaust gas to pass therethrough. For this purpose, as shown in FIG. 6, the blocking plate 421 includes the air vent 4211 that is a circular opening shown in an upper part of the drawing. A bottom of the blocking plate 421 blocks entered rainwater. With this arrangement, when the exhaust gas after substantially uniformly flowing out through the end surface of the filter case 3 near the downstream side passes through the air vent 4211 of the blocking plate 421, a flow distribution becomes ununiform. Most of the exhaust gas after passing through the air vent 4211 is smoothly discharged from the wide open slit 4411A. The rest of the exhaust gas passes through the other slits 4411, so that the flow of the exhaust gas is reliably changeable in the radial direction toward the outlet 40 and is smoothly dischargeable.

Next, the flow of the exhaust gas in the exhaust gas emission control system 1 will be described with reference to the cross-sectional view of the exhaust gas emission control system 1 shown in FIG. 7.

Firstly, the exhaust gas flows in the inlet 20 of the inlet case 2 through the exhaust pipe of the engine and passes through the inflow pipe 21 in the radial direction of the inflow body 22 (the arrow A1). When the exhaust gas passes through the other slits 2411, the exhaust gas flows out of the inflow pipe 21 while a flow direction of the exhaust gas is changed by the inclined plate 2412. The exhaust gas flows into the inflow body 22 and approaches the flow regulation member 221 (the arrow A3). Here, a part of the exhaust gas reaches near the inclined surface 231 and passes without stagnation through the slit 2411A, which is the largest opening starting from the end of the inflow body 22 near the upstream side, and the slits 2411 nearby the slit 2411A, whereby the exhaust gas flows out of the inflow pipe 21 while the flow direction of the exhaust gas is changed by the inclined plate 2412. The exhaust gas flows into the inflow body 22 and approaches the flow regulation member 221 (the arrow A2). As a result, the flow of the exhaust gas is dispersed to be nearly uniform near the upstream side relative to the flow regulation member 221.

When the exhaust gas passes through the flow regulation member 221, the flow distribution of the exhaust gas is made further uniform and flows into the oxidation catalyst 222 (the arrow A4).

The exhaust gas after flowing into the oxidation catalyst 222 is heated up by combusting the dosing fuel as needed and flows out of the oxidation catalyst 222. Subsequently, the exhaust gas flows into the filter case 3 with a uniform distribution over the end surface of the soot filter 31 of the filter case 3 (the arrow A5).

Subsequently, the exhaust gas flows out of the soot filter 31 near the downstream side with PM captured by the soot filter 31, and passes through the air vent 4211 of the blocking plate 421 within the outlet case 4 (the arrow A6). The exhaust gas after passing through the air vent 4211 flows out of the outflow body 42. Subsequently, the exhaust gas flows into the outflow pipe 41. The exhaust gas mostly passes through the maximum open slit 4411A of the outflow pipe 41 and the slits 4411 nearby the slit 4411A, the slit 4411A being positioned substantially corresponding to the air vent 4211. On the other hand, even the exhaust gas after failing to pass through the slit 4411A and the like passes through the rest of the slits 4411, whereby the flow direction of the exhaust gas is changed by the inclined plate 4412 and is smoothly discharged out of the outlet 40 (the arrow A7).

Incidentally, the present invention is not limited to the above-described present embodiments, but includes modifications and improvements as long as the objects of the present invention can be achieved.

In the above exemplary embodiment, for instance, the inflow pipe 21 and the outflow pipe 41 are respectively provided to the ends of the inlet case 2 and the outlet case 4 to extend in the radial direction thereof. However, one or both of the inflow pipe 21 and the outflow pipe 41 may extend in the axial direction of the inlet case 2 and the outlet case 4.

In the above exemplary embodiment, both the inlet case 2 and the outlet case 4 are respectively provided with the louver members 24 and 44. However, one of the inlet case 2 and the outlet case 4 may be provided with the louver member 24 or 44. In the above exemplary embodiment, the inflow pipe 21 and the outflow pipe 41 are directed toward the same radial direction. However, the direction of each of the inflow pipe 21 and the outflow pipe 41 may be different. For instance, the outflow pipe 41 may be half-turned around the axis N of the filter case 3 relative to the inflow pipe 21.

In the above exemplary embodiment, in the louver members 24 and 44, the opening areas of the slits 2411A and 4411A are larger than those of the other slits 2411 and 4411, the slits 2411A and 4411A being positioned above the other slits 2411 and 4411. However, the opening areas of the slits 2411A and 4411A may be the same as those of the other slits 2411 and 4411.

In the above exemplary embodiment, the blocking plate 421 is provided in the outlet case 4. However, the blocking plate 421 may not be provided. In such a case, since the exhaust gas after passing through the soot filter 31 flows in over the entire second louver member 44, a flow of the exhaust gas becomes smoother.

Although the exhaust gas emission control system 1 according to the above exemplary embodiments is provided with the oxidation catalyst 222, the oxidation catalyst 222 may be omitted according to a different recovering method of the soot filter 31.

Although the heat insulator is made of ceramic fibers in the above exemplary embodiment, the heat insulator may be made of glass fibers or any appropriate material.

The invention claimed is:
1. An exhaust gas emission control system comprising:
  a cylindrical inflow body through which exhaust gas passes, the cylindrical inflow body extending along its longitudinal flow axis;
  an inflow pipe into which the exhaust gas flows, the inflow pipe being provided at an upstream side of the cylindrical inflow body and extending in a radial direction away from the longitudinal flow axis of the cylindrical inflow body;
  a cylindrical outflow body through which the exhaust gas passes, the cylindrical outflow body extending along its longitudinal flow axis;

an outflow pipe from which the exhaust gas flows, the outflow pipe being provided at a downstream side of the cylindrical outflow body and extending radially away from the longitudinal flow axis of the cylindrical outflow body; and a filter case that houses a soot filter, the filter case being interposed between the cylindrical inflow body and the cylindrical outflow body, wherein the inflow pipe includes a louver member that covers at least a portion of an opening on the upstream side of the cylindrical inflow body, the inflow pipe being configured to guide the exhaust gas in the radial direction toward the upstream opening of the cylindrical inflow body and into the cylindrical inflow body, and the louver member defines a plurality of slits that extend in a direction orthogonal to the longitudinal flow axis of the cylindrical inflow body and includes direction changing plates that are configured to change a flow direction of the exhaust gas passing through the slits, spaces between adjacent pairs of the direction changing plates defining the slits, wherein a first of the plurality of slits that is positioned closest to an upstream side of the inflow pipe in the radial direction has and opening area that is larger that each of the remaining ones of the plurality of slits.

2. The exhaust gas emission control system according to claim 1, wherein
a flow regulation member having multiple openings through which the exhaust gas passes is provided near the downstream side relative to the louver member.

3. The exhaust gas emission control system according to claim 1, wherein one of the direction changing plates provided near the upstream side of the flow direction of the exhaust gas in the radial direction has a large inclination angle, and the rest of the direction changing plates provided closer to the downstream side of the flow direction of the exhaust gas have a smaller inclination angle.

4. The exhaust gas emission control system according to claim 1, wherein
the outflow pipe includes an additional louver member that covers at least a portion of an opening on the downstream side of the cylindrical outflow body, and
a blocking plate that prevents inflow-water through the outflow pipe from entering the filter case is provided near the upstream side relative to the additional louver member.

5. The exhaust gas emission control system according to claim 1, wherein
the outflow pipe includes an additional louver member that covers at least a portion of an opening on the downstream side of the cylindrical outflow body.

6. An exhaust gas emission control system comprising:
a cylindrical inflow body through which exhaust gas passes, the cylindrical inflow body extending along its longitudinal flow axis;
an inflow pipe into which the exhaust gas flows, the inflow pipe being provided at an upstream side of the cylindrical inflow body and extending in a radial direction away from the longitudinal flow axis of the cylindrical inflow body;
a cylindrical outflow body through which the exhaust gas passes, the cylindrical outflow body extending along its longitudinal flow axis;
an outflow pipe from which the exhaust gas flows, the outflow pipe being provided at a downstream side of the cylindrical outflow body and extending radially away from the longitudinal flow axis of the cylindrical outflow body; and a filter case that houses a soot filter, the filter case being interposed between the cylindrical inflow body and the cylindrical outflow body, wherein the inflow pipe being configured to guide the exhaust gas in the radial direction toward the upstream opening of the cylindrical inflow body and into the cylindrical inflow body the outflow pipe being configured to guide the exhaust gas out of the opening at the downstream side of the cylindrical outflow body and away from the cylindrical outflow body in the radial direction the inflow pipe comprises a first louver member that covers at least a portion of the opening at the upstream side of the cylindrical inflow body, the outflow pipe comprises a second louver member that covers at least a portion of an opening on the downstream side of the cylindrical outflow body, the cylindrical inflow body houses an oxidation catalyst for oxidizing a dosing fuel to generate heat and comprises a flow regulation member that has multiple openings through which the exhaust gas passes and is provided near the downstream side relative to the first louver member, the cylindrical outflow body comprises a blocking plate that prevents inflow-water through the outflow pipe from entering the filter case and is provided near the upstream side relative to the second louver member, the first louver member comprises: a plurality of first slits that extend in a direction orthogonal to the flow direction of the exhaust gas in the radial direction of the cylindrical inflow body, a first of the plurality of first slits that is positioned closest to an upstream side of the inflow pipe in the radial direction having an opening area that is larger than each of the remaining ones of the plurality of first slits; and first direction changing plates that change a flow direction of the exhaust gas passing through the first slits, spaces between adjacent pairs of the first direction changing plates defining the first slits, and the second louver member comprises: a plurality of second slits that extend in a direction orthogonal to the flow direction of the exhaust gas in the radial direction of the cylindrical outflow body; and second direction changing plates that change a flow direction of the exhaust gas passing through the second slits, spaces between adjacent pairs of the second direction changing plate defining the second slits.

7. The exhaust gas emission control system according to claim 2, wherein
the inflow pipe has a shape that allows the exhaust gas to pass through the inflow pipe in the radial direction of the cylindrical inflow body until reaching an end of the cylindrical inflow body near the upstream side, and to flow into the cylindrical inflow body from the end of the cylindrical inflow body.

8. The exhaust gas emission control system according to claim 1, wherein one of the direction changing plates provides near the upstream side of the flow direction of the exhaust gas in the radial direction has a large inclination angle, and the rest of the direction changing plates provided closer to the downstream side of the flow direction of the exhaust gas have a smaller inclination angle.

9. The exhaust gas emission control system according to claim 2, wherein
the outflow pipe includes an additional louver member that covers at least a portion of an opening at the downstream side of the cylindrical outflow body.

10. The exhaust gas emission control system according to claim 3, wherein
the outflow pipe includes an additional louver member that covers at least a portion of an opening at the downstream side of the cylindrical outflow body.

* * * * *